United States Patent [19]

Rose et al.

[11] Patent Number: 5,227,260
[45] Date of Patent: Jul. 13, 1993

[54] SEALED LEAD ACID BATTERY USING MODULAR FRAME CONSTRUCTION

[75] Inventors: Jennifer L. Rose, Cudahy; John P. Dinkelman, South Milwaukee; Gerald K. Bowen, Cedarburg; Michael G. Andrew, Wauwatosa, all of Wis.

[73] Assignee: Globe-Union, Inc., Milwaukee, Wis.

[21] Appl. No.: 787,582

[22] Filed: Nov. 4, 1991

[51] Int. Cl.⁵ .................... H01M 2/12; H01M 2/14
[52] U.S. Cl. ........................................ 429/54; 429/82; 429/130; 429/138; 429/152; 429/154; 429/153; 429/161; 429/185
[58] Field of Search ............ 429/54, 82, 130, 138, 429/152, 153, 154, 161, 185

[56] References Cited

U.S. PATENT DOCUMENTS

| | | |
|---|---|---|
| 3,402,077 | 9/1968 | Kido et al. ............................ 429/54 |
| 4,618,545 | 10/1986 | Clegg et al. . |
| 4,659,636 | 4/1987 | Suzuki et al. . |
| 4,664,994 | 5/1987 | Koike et al. . |
| 4,678,725 | 7/1987 | Kikuchi et al. . |
| 4,745,039 | 5/1988 | Yoshinaka . |
| 4,929,518 | 5/1990 | Yoshinaka et al. . |
| 5,004,655 | 4/1991 | Symanski ............................. 429/82 |
| 5,035,966 | 7/1991 | Tokunaja et al. ................. 429/130 |

Primary Examiner—Olik Chaudhuri
Assistant Examiner—M. Nuzzolillo
Attorney, Agent, or Firm—Foley & Lardner

[57] ABSTRACT

The preferred embodiment of the present invention relates to a sealed, oxygen recombinant lead-acid battery which includes a series of modules, e.g. 4-volt modules. The modules are prepared from frame and film assemblies which are easily stacked to the desired voltage or capacity. In the preferred embodiment, the assemblies include two 2.0 normal voltage cells, attached in series, three of which are then combined to form a 12-volt system. Modularity eliminates the need for expensive tooling and parts inventory and permits the creation of a wide variety of battery designs. Specially designed vents are employed to permit gas escape during overcharge or if recombination efficiencies are less than desired and to prevent entry of oxygen or moisture when the battery is in its recombinant mode.

27 Claims, 3 Drawing Sheets

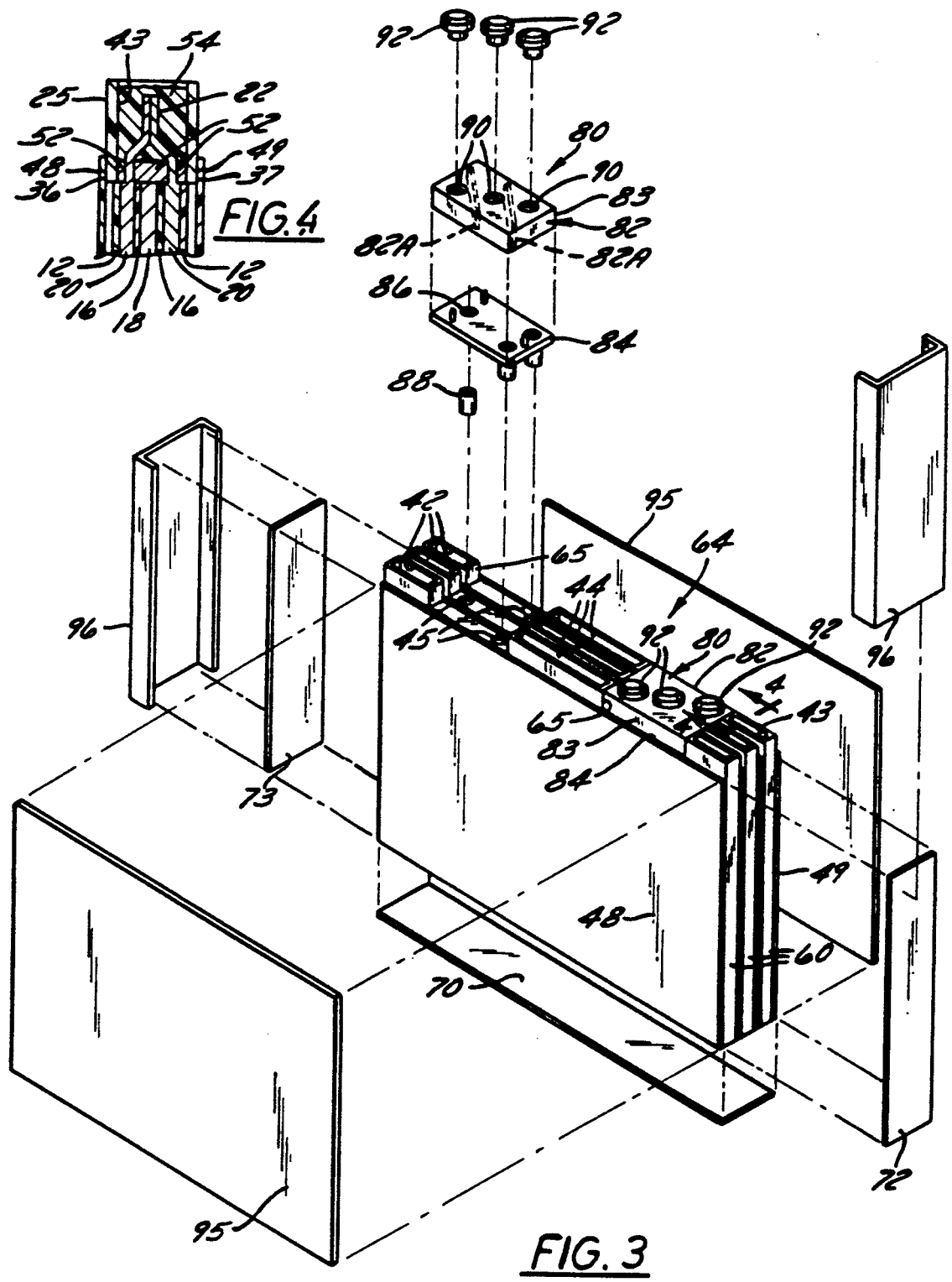

SEALED LEAD ACID BATTERY USING MODULAR FRAME CONSTRUCTION

BACKGROUND OF THE INVENTION

1. Field of the Invention

The present invention relates generally to the art of lead-acid batteries, and more particularly to lead-acid batteries of the oxygen recombinant variety. Still more specifically, the invention relates to a modular frame construction technique, preferably including two compartments for individual battery cell packs. Modularity permits construction of a wide variety of battery designs and capacities, while eliminating the need for expensive housings, tooling and parts inventory.

2. Description of the Prior Art

Recombinant electric storage cells have been known for several years. Generally, such cells contain a reduced amount of electrolyte such that most of it is absorbed into the cell elements (plates and separators) and the cell elements are selected to absorb the gases evolved within the cells. Vents have been provided for the cells to allow excess gas to be vented to the atmosphere, for example, when an overcharge condition occurs during battery formation or when, for some reason, the recombinant efficiency is less than that desired. An example of such a recombinant battery is shown in U.S. Pat. No. 4,618,545 issued Oct. 21, 1986 to Clegg for "Recombination Electric Storage Cells". The patent illustrates a stack of battery elements maintained under a compressive force which is transmitted through special reinforcing members contained in the separators. A major portion of the battery plates are contained by surrounding glass fiber material of the separators.

Recombinant batteries are highly desirable for volume restricted applications where short-duration, high power capability and medium to high cycle life with no maintenance is required. For example, their use in portable powered equipment is known, and several different battery configurations have previously been described in the literature. In some instances these include a film bag for containing the electrodes, separator and electrolyte, a venting system and a system for compression of the film packets to maximize plate and separator contact and to thereby increase the efficiency of the recombinant reactions.

A variety of flattened cell batteries are disclosed in patents assigned to Matsushita Electric Industrial Co., Ltd. One such battery is disclosed in U.S. Pat. No. 4,659,636 issued April 21, 1987 to Suzuki, et al. for "Sealed Storage Battery". In this patent, a plurality of bags, each containing a polar battery plate group, are stacked in a thicknesswise direction and pressurized in a casing. The principal focus of the patent is on the uniform pressure provided by the casing, although the pouch construction and a venting arrangement are shown. The plates and the separators disclosed are of a type which are also applicable to the present invention.

Another patent in this series is U.S. Pat. No. 4,664,994 issued May 12, 1987 to Koike, et al. for "Enclosed Lead Storage Battery And Process For Producing The Same". Here the principal features are the bag or jacket material and the surrounding of the battery posts with an enclosure layer adapted to provide increased sealing efficiency with the jacket. In the preferred embodiments the pole posts are surrounded with a layer of polyolefin and the jacket includes a laminate film with the inner layer being a polyolefin. In this construction, the inner layers of the film can be heat sealed to one another to form the pouch and the posts can be sealed as well. In the disclosed preferred embodiment, the laminate includes three layers, with the outer layer being a material to provide strength, such as a PET, and with an intermediate layer, such as polyvinylidene chloride, which is used to prevent oxygen and moisture permeability. Use of an epoxy resin in the area of the posts to prevent electrolyte leakage is also disclosed. This patent, while describing the bag or pouch, does not discuss the use thereof in multi-bag recombinant electrode systems.

In Kikuchi, et al. U.S. Pat. No. 4,678,725 issued Jul. 7, 1987 for "Hermetically Sealed Storage Battery", another flexible pouch system is disclosed which employs the heat sealing of a peripheral portion of film sheets about the plates of an oxygen recombinant battery plate and separator assembly. The invention disclosed in this patent is a seal which includes a pair of flaps of the film sealed along their edges, but with a channel remaining unsealed to act as an escape vent for gases produced during formation of the battery or for oxygen gas which is produced during battery storage and use and which is not acceptably absorbed by the negative electrodes. In the preferred embodiment, silicone oil is placed in the channel to prevent undesirable ingress of oxygen or moisture.

An oxygen recombinant battery system is also disclosed in U.S. Pat. No. 4,745,039 issued to Yoshinaka on May 17, 1988 for "Sealed Lead Storage Battery". In this patent, the plates are contained in a rigid casing and a breathing hole is provided therein. A safety valve includes a rubber plate over the breathing hole and an elastic pad over the rubber plate urges the plate against the casing. Improved venting of formation gas or excess oxygen produced during use or storage of the battery is alleged.

Finally, another recombinant system is shown in U.S. Pat. No. 4,929,518 issued May 29, 1990 to Yoshinaka, et al. for "Sealed Lead-Acid Storage Battery". In this patent a rigid, frame-like casing of polyolefin material, such as polyethylene, contains positive and negative electrode plates and a separator, the casing surrounding the periphery thereof. Metal plates, laminated with a layer of thermoplastic, are heat welded to the rim of the casing to form an enclosure of the electrode elements, and the terminal posts of the electrodes are provided with epoxy-resin and polyolefin coatings similar to those described earlier. A vent is arranged over a breathing hole in the casing, the vent including a flat rubber sheet in contact with the surface containing the hole, and a layer of cushion material is compressed thereover by a pressing plate. The pressing plate is adapted to create sufficient pressure on the rubber sheet to prevent gas escape from the casing except during periods of excessive gas pressure (i.e. pressures derived from formation gas or inefficient absorption of oxygen by the negative electrode).

While certain concepts and constructions used in the aforementioned patents will be used as well in the battery of the present invention, many of the aforementioned devices suffer from one or more drawbacks. Principally, the devices still require a specially designed outer casing for those which employ more than one cell pack, and they do not provide design flexibility or eliminate the need for large inventories of bulky battery housings. A modular electrode design which would permit construction of a variety of batteries of various voltages and sizes would represent a substantial advance in the art.

SUMMARY OF THE INVENTION

The present invention, in its preferred embodiment, features an oxygen recombinant lead-acid battery having a unique frame arrangement which provides flexibility in battery design. The invention also features a method and system for eliminating bulky battery outer housings. A further feature of the invention is the preparation of modules which can be used singly or in combination with others to provide stacked battery systems of the desired capacity or voltage.

The present invention also features techniques for sealing modular frame assemblies and vent structures which are useful in designs incorporating the featured modularity.

Another feature of the present invention is the ability to uniformly compress the electrode elements and separators used in the recombinant system to improve battery efficiency.

How these and other features are accomplished in the present invention will become apparent after the following detailed description of the preferred embodiment is read in conjunction with the FIGURES Generally, however, they are accomplished by preparing cell packs which include positive and negative electrode elements, separator material and electrolyte, the cell packs being generally similar to those described above or which otherwise would be useful in an oxygen recombinant lead-acid battery system. A unique frame is provided for containing a plurality of the cell elements, the frame including openings in its periphery, for passage of the collector lugs, and breathing holes. Suitable sealing of the lugs is provided. After insertion of the cell packs in the frame, a heat sealable material is preferably applied to the front and back frame surfaces (an adhesively applied film layer could also be used) to result in a hermetically sealed module. For example, if two 2-volt cell packs were incorporated in a two opening frame, a 4-volt module would result. If desired, a plurality of the modules may be connected together, physically and electrically, and a suitable vent is added to prevent entry of moisture or oxygen through the breathing hole, while permitting the escape of gas from within the cell element in the event pressure exceeds desired levels, e.g., pressures resulting from gases produced during formation or gases resulting from battery storage or use and which are not efficiently combined into the negative electrode. After joining the modules, plates are clamped against the assembly to exert the desired pressure against the cell element components, with the pressure being uniformly distributed due in part to the presence of the frames. Other ways in which the features are accomplished will become apparent to those skilled in the art once the following detailed description of the preferred embodiment has been read and understood. Such ways are deemed to fall within the scope of the present invention if they fall within the scope of the claims which follow.

DESCRIPTION OF THE DRAWINGS

FIG. 3 is a perspective view of a battery comprised of three frame assemblies shown in FIG. 2 and illustrating in exploded form one of the vents and the plate compression system;

FIG. 4 is an enlarged cross-sectional view taken along the line 4—4 of FIG. 3 showing the manner in which a collector lug is sealed in the frame.

In the various drawings, like reference numerals are used to illustrate like components.

DETAILED DESCRIPTION OF THE PREFERRED EMBODIMENT

Figure 1:
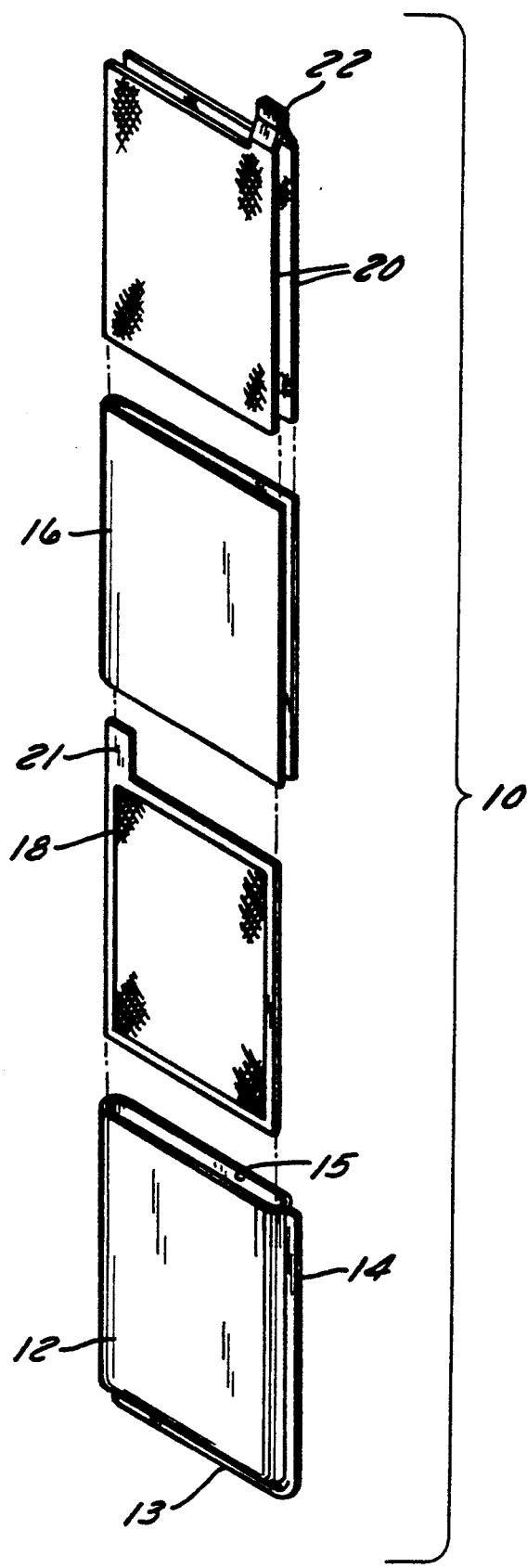
FIG. 1 is an exploded view of the cell pack components for a cell element to be used in the modular battery system of the preferred embodiment of the invention.

Before proceeding to the details of the preferred embodiment, several general background comments are in order regarding the present invention and its applicability to a variety of configurations and end uses. First, details of the various plate and separator structures will not be provided as, in and of themselves, they are well-known to the art. Examples are provided in the patents discussed earlier in this specification and others are readily available in standard texts on lead-acid batteries. Moreover, the recombinant battery system is known, as is shown, for example, in certain of the patents discussed above.

It should also be recognized that while two-opening modular frames, each containing 2-volt cell packs are shown in the drawings and are described in the following description, other modular arrangements can be prepared. For example, a modular frame with three openings could be prepared (two of which would yield a 12-volt system if each opening included a two volt cell pack) or a six opening frame arranged in a 2-wide 3-deep pattern could be employed for the same 12-volt system. The modifications which would be necessary for such alternatives to the preferred embodiment will readily appear to those skilled in the art after the description of the preferred embodiment has been read and understood. However, since a principal feature of the invention is battery design flexibility, the illustrated embodiment having two openings is most desirable. Single opening frames with interlocking systems on their perimeter could also yield the desired design flexibility, resulting in a combined module appearing very similar to that illustrated below for the preferred embodiment.

Still by way of background, the plastic film used for frame enclosure is preferably selected from those films which exhibit the combined properties of heat sealability, strength, acid resistance and high levels of resistance to oxygen and moisture permeability. The three layer structures discussed above are most preferred, e.g. those having an inner layer of a thermoplastic polyolefin, an intermediate layer of polyvinyledine chloride for preventing oxygen and moisture permeability and an outer layer of PET for strength. These types of materials will hereinafter be referred to as "tri-layer" films, the most preferred being Pantry Pack 902 manufactured by American National Can Company. Substitutes of specific resins can be made for any of the layers as will be appreciated by those skilled in the art of resin film design, so long as the desired properties are present. For some applications, only a thermoplastic film might be employed, but tri-layer films are most desirable for quality products for use in demanding applications.

The present invention also will be described in the context of a case-less system, i.e. one in which the normal outer battery housing is eliminated. However, such housings can be used, if desired, or the assembly of the preferred embodiment can be used in a dipped battery system, such as the one disclosed in co-pending, commonly assigned U.S. patent application Ser. No. 07/624,197, filed Dec. 6, 1990 and entitled "Caseless Battery".

Proceeding now to a description of FIG. 1, the elements of a cell pack 10 are shown to include a film pouch 12, preferably made from a folded sheet of heat shrinkable polypropylene which is suitably sealed along its bottom 13 and side 14 to form a containment for the battery elements to be described shortly. Pouch 12 has an open top 15.

The battery elements include a sheet 16 of separator folded about a positive plate 18, on either side of which is placed an oxygen absorbing negative plate 20. The preferred separator is about 95% glass fiber and about 5% polypropylene fibers. A typical positive plate would be a gravity cast rectilinear calcium alloy grid, pasted with 4.2 g/cc density active lead material, while a typical negative plate would be expanded metal, calcium alloy grid pasted with 4.2-4.4 g/cc density active material containing a suitable expander. In a prototype, the separator has a thickness of about 0.039", the positive plate of about 0.060" and the negative plate of about 0.034". Heat shrinkage around the tri-plate element serves to maintain plate alignment throughout all stages of battery assembly. The polypropylene also serves to retain the limited volume of normal electrolyte (not shown) within the plates and separator during fill and formation.

The collector lugs from electrodes 18 and 20 are shown respectively at 21 and 22 and, as seen in this FIG., are located on opposite sides, so that when assembled and inserted in pouch 12 they will extend upwardly from opposite sides of the open top 15.

Figure 2:
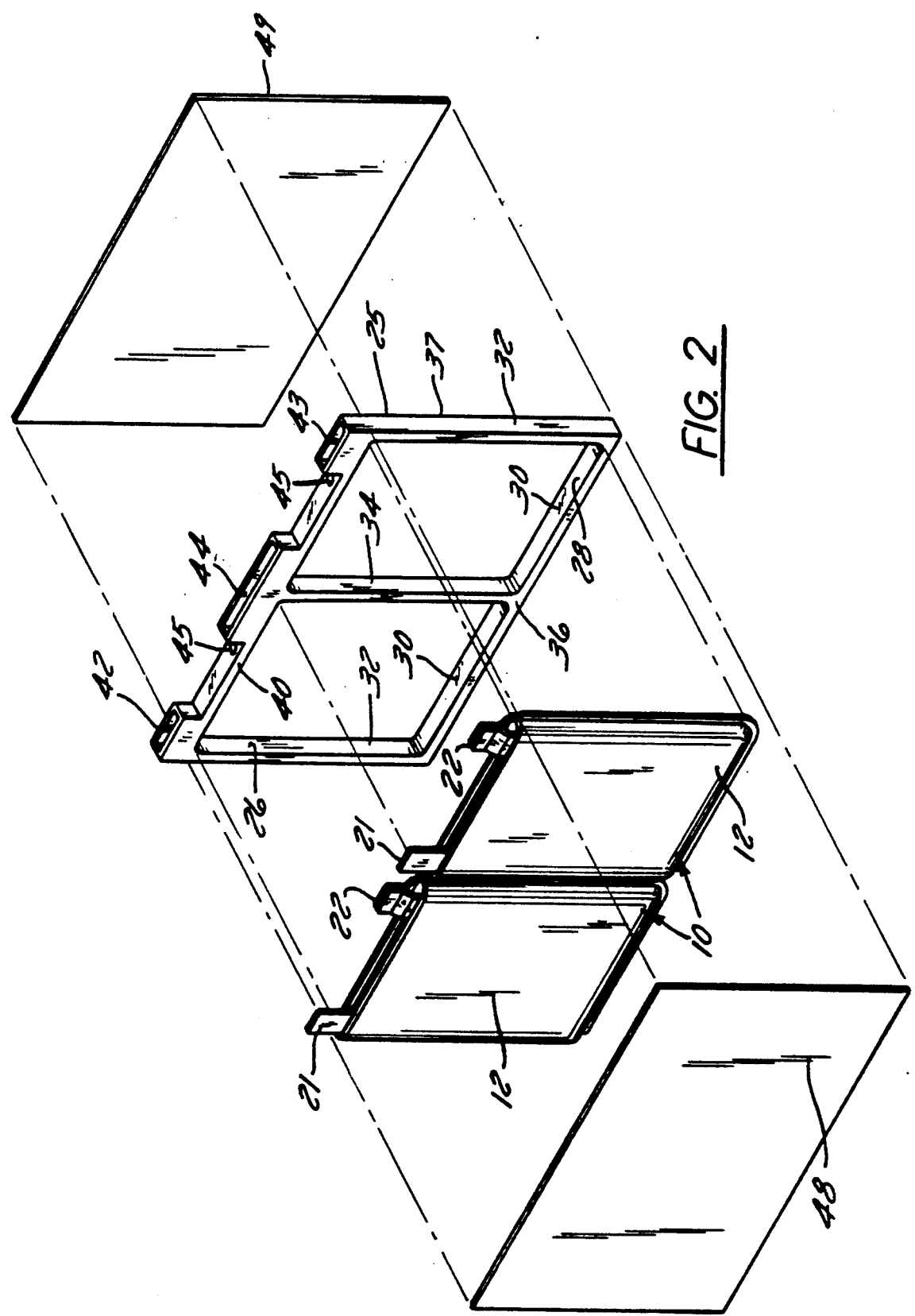
FIG. 2 is an exploded view of a frame assembly using two cell packs of FIG. 1 and illustrating the film sealing of the assembly and the lug opening and breathing hole components of the frame.

Referring next to FIG. 2, two completed cell packs 10 are shown in side-by-side relationship, as they will be arranged when inserted into a modular frame 25 now to be described. Frame 25 is preferably prepared from polypropylene, but other non-conductive, acid-resistant materials can be used. As will become more apparent below, a polyolefin is ideal in that it is a good heat seal receptor for other components of the module. Frame 25 is a generally rectangular unitary molding or casting including a pair of rectangular openings 26 and 28, each adapted to receive a single cell pack 10. The openings 26 and 28 are defined by a bottom wall 30, an outer wall 32 and by a common center spine 34. The thickness of frame 25 is substantially equal to the thickness of the cell packs 10 and the frame also includes a front face 36 and a back face 37. The openings 26 and 28 are also defined by a multi-component top 40 which includes a pair of lug openings 42-43 on the outer edges of frame 25 and a central lug opening 44 arranged over spine 34. From the exploded FIG. 2, it will become apparent that the collector lug 21 from positive plate 18 of the left cell pack will extend upwardly and project above opening 42 and that the collector lug 22 from the negative plate 20 of the right cell pack 10 will extend upwardly and project above opening 43. At the same time, the opposite lugs from the left and right cell packs 10 will extend upwardly and project above central opening 44.

Also noted in FIG. 2 are a pair of breathing holes 45 extending vertically through top 40. When inserted in frame 25, the open tops 15 of the cell packs 10 will abut the underside of top 40 so that the breathing holes 45 will communicate with the cell pack interiors.

The next step in the construction of a module is to place a packing, e.g. packaging made of polytetrafluoroethylene sold under the trademark TEFLON ®, 52 (see FIG. 4) around each of the lugs prior to insertion into openings 42-44. Preferably this is accomplished from beneath the openings. The openings 42-44 are also preferably etched, e.g. by flame or plasma treatment, or are chemically treated with a $K_2Cr_2O_7/H_2SO_4$ etching solution (or equivalent). The lugs are then brushed with wood rosin extract. The latter material prevents positive collector lug corrosion and also prevents electrolyte wicking, a potential cause for premature battery failure.

Construction of the modular 4-volt unit now being described is continued by the attachment of film sheets 48 and 49 respectively to the front face 36 and back face 37 of frame 25. The film sheets 48 and 49 are preferably of the tri-layer variety previously disclosed, and they are preferably attached with their polyolefin (thermoplastic) layer being heated, melted and sealed to the frame 25. If desired for any reason, an adhesive could be employed, keeping in mind the normal requirements for materials used in constructing lead-acid batteries (i.e. temperature adaptability, acid-resistance, etc.). In our prototype battery the completed module 60 (see FIG. 3) has a thickness of about 0.579".

Finally, as shown in FIG. 4, a two-part epoxy potting material 54 FE5045A Red Resin, FE5046B Hardener, and FE5046A Grey Resin manufactured by H. B. Fuller Company, is placed into openings 42-44 to complete the seal around lugs 21 and 22. This material may be inserted in any suitable manner, such as by a syringe. The lug seal then is really a multi-component seal including a polytetrafluoroethylene, such as is sold under the trademark Teflon ® 52, the wood rosin extract, and the potting material 54. The rosin and acid etch are highly effective in establishing a leak and corrosion proof seal about the lugs.

The preparation of a 12-volt battery 64 from three of modules 60 is illustrated in FIG. 3, but it would be useful here to again indicate that 8, 16 or other voltage batteries could be prepared using the appropriate number of modules 60, each of which could also be prepared to have a voltage greater or small than 4-volts. Battery 64 is made from 3 modules 60 arranged in a fronting configuration so that the openings 42-44 are aligned in a row and so that the recesses 65 between openings 42 and 44 and between openings 43 and 44 are also aligned.

In our preferred embodiment it should be noted that the breathing hole 45 of the middle module 60 is located closer to the outer edge of the third module, a feature which is not required but which is important in the venting process and apparatus and the electrical connections soon to be described. Not shown in FIG. 3 are the inter-module electrical connections between the various lugs 21 and 22. They are not shown for purposes of simplifying the FIGURES, and in and of themselves are conventional in design.

Either before or after the insertion of the vents soon to be described in detail, in our most preferred embodiment the battery 64 is further protected against oxygen and moisture by the application of a final film of tri-layer material about bottom and sides of battery 64. In the illustration of FIG. 3 this is shown by providing a sheet 70 of the tri-layer film to cover the bottom, and by two rectangular sheets 72 and 73 to cover the ends. Other patterns for providing the desired coverage could be employed. Heat sealing again is the preferred technique for applying sheets 70, 72 and 73, but adhesives could be used as has been discussed earlier in this specification.

The vent device 80 of the preferred embodiment is shown in exploded form on one side of battery 64 and in the operating position on the other. Vent 80 includes a hollow manifold housing 82 which is designed and arranged to fit within the area defined by recesses 65 mentioned previously. Housing 82 is divided into three chambers in our most preferred embodiment (by diagonal walls 82A) and is made from polypropylene (glass filled polypropylene could be used). Housing 82 consists of two portions 83 and 84, portion 83 being the upper chamber, and portion 84 being a generally planar plate, the portions 83 and 84 being bonded by a suitable epoxy resin. The same resin is also used to seal and secure vent 80 in the recess area. The bottom plate 84 includes three holes 86 arranged to mate with the breathing holes 45 and a barrel 88 made from polypropylene is epoxied to each so that, when seated, the barrels 88 will penetrate the breathing holes 45.

The top chamber 83 of the housing 82 is provided with three holes 90 for receiving umbrella vents 92 of known design. An internal gauge pressure of 3 psi or so is provided as the design pressure for breaking the umbrella vent seal, while resealing of the system would occur at about 2 psi.

Variations to the vent system are also possible, such as using heat or ultrasonic welding to secure vent 80 in place, and for some applications it may be desirable to place rubber gaskets (not shown) around barrels 88 to further ensure a leak-free seal.

The final step in the preparation of the completed battery 64 is to apply end plates 95, e.g. made from steel, aluminum or other suitable material against the front and back faces of battery 64 so that even pressure will be applied against both faces of each of the cell packs located in battery 64. A uniform pressure of about 4 psi on the plates is preferred, and the present invention facilitates achievement of that goal since plates 95 are urged against the frames 25, including the center spine 34 thereof, all of which enhances the spreading of pressure forces over the entire surface of the cell packs. As is known, the recombinant system works best under such conditions. Plates 95 may be contained in any suitable manner, such as by use of a pair of channel containment elements 96 disposed along the vertical sides of the battery.

Battery formation occurs prior to use of the battery using known techniques, the venting system 80 being activated should formation gasses exceed the pressure (e.g. 3 psi) chosen for the umbrella vent 92.

While a specific and preferred embodiment of the present invention has been shown and described in detail in connection with FIGS. 1-4, the invention is not to be limited thereby but is to be limited solely by the scope of the claims which follow.

What is claimed is:

1. A battery module comprising a frame having a front and back face and at least two openings therein for receiving cell packs, a cell pack in each opening and each cell pack including electrolyte, positive and negative electrode elements, separator material and a pouch for containing the elements, separator and electrolyte, the pouch having an open top but being otherwise sealed and a breathing hole in the frame for each cell pack, the breathing hole extending through the frame and arranged to communicate with the open top of the pouch to permit the venting of gases from within the pouch to a location outside the frame.

2. The module of claim 1 wherein the cell pack is an oxygen recombinant lead-acid battery cell pack.

3. The module of claim 1 wherein a film layer is applied over each opening containing a cell pack.

4. The module of claim 1 wherein the frame is constructed from a polyolefin.

5. The module of claim 3 wherein the frame is constructed from a polyolefin and wherein the film layer is heat sealed to the frame.

6. The module of claim 5 wherein the film layer is a laminate having a first outside layer made from a polyolefin which is heat sealed to the frame.

7. The module of claim 6 wherein the laminate includes an intermediate resin layer providing resistance to oxygen and moisture permeability and a second outside layer providing toughness.

8. The module of claim 1 wherein each cell pack includes positive and negative collector lugs extending from the top of the pouch and wherein openings are provided in the frame for receiving the collector lugs.

9. The module of claim 8 wherein the collector lugs are sealed in the openings.

10. The module of claim 9 wherein the collector lugs are sealed in the openings by providing an acid-resistant pliable material gasket about each lug, wherein the openings are etched with an acid etching agent and wherein a potting material completes the seal.

11. The modules of claim 10 wherein the frame is a polyolefin frame, the gasket material is Teflon ®, and the potting material is a two-part epoxy resin.

12. The module of claim 8 wherein the lugs are coated with a wood rosin extract.

13. A battery module comprising a generally planar frame constructed of a polyolefin material, the frame having front and back faces and a pair of generally rectangular openings, adapted to receive a cell pack, each cell pack including a pouch containing a battery electrode assembly comprising positive and negative electrode elements, separator material and electrolyte, the pouch having an open top, the frame having a pair of breathing holes extending through an edge thereof and adapted to communicate with the open top of the cell packs when the cell packs are inserted in the frame, collector lugs on the positive and negative electrode elements extending outwardly from the top of the cell packs, openings in the frame for receiving the lugs, means for sealing the lugs within the openings and a film layer sealingly applied to the front and back faces and covering the openings.

14. The module of claim 13 wherein the electrode assembly is of the oxygen recombinant lead-acid type.

15. The module of claim 13 wherein the film layer includes an inner face of a polyolefin and the seal is a heat seal.

16. The module of claim 13 wherein the collector lugs are sealed in the openings by providing an acid-resistant pliable material gasket about each lug, wherein the openings are etched with an acid etching agent and wherein a potting material completes the seal.

17. The modules of claim 16 wherein the gasket material is Teflon ®, the etching agent is $K_2Cr_2O_7/H_2SO_4$ and the potting material is a two-part epoxy resin.

18. The module of claim 13 wherein the lugs are coated with a wood rosin extract.

19. A battery comprising a plurality of electrically coupled modules as claimed in claim 1 and further comprising vents for preventing ingress of oxygen or moisture into the cell packs through the breathing holes and for permitting the escape of gas from within the cell packs if the pressure thereof reaches a predetermined level.

20. The battery of claim 19 wherein each cell pack is an oxygen recombinant lead-acid battery cell pack.

21. The battery of claim 19 wherein an acid-resistant film layer is applied to the front and back faces of each frame.

22. The battery of claim 21 wherein the frames are made from a polyolefin, and wherein the film layers are heat sealed to the frames.

23. The battery of claim 19 wherein a laminate of acid resistant and oxygen and moisture impermeable film is sealed to at least some of the outer surfaces of the battery.

24. The battery of claim 19 wherein each cell pack includes positive and negative collector lugs extending from the top of the pouches and wherein openings are provided in the frames for receiving the lugs, the lugs being sealed in the openings.

25. The battery of claim 19 wherein the vent comprises at least one manifold housing sealed to the frames, the housing including openings mating with the breathing holes and an aperture containing a reciprocating device adapted to open when the pressure within the housing exceeds a first predetermined pressure and to close when the pressure within the housing falls below a second predetermined pressure.

26. The battery of claim 25 wherein the reciprocating device is an umbrella vent seal.

27. The battery of claim 25 wherein each frame includes two side-by-side openings for containing cell packs and wherein a recess is provided in the top of each frame above the cell packs and further providing that a vent manifold housing is provided in each area defined by the adjoining recesses of adjoining frames.

* * * * *

UNITED STATES PATENT AND TRADEMARK OFFICE
CERTIFICATE OF CORRECTION

PATENT NO. : 5,227,260

DATED : July 13, 1993

INVENTOR(S) : Jennifer L. Rose, et al.

It is certified that error appears in the above-identified patent and that said Letters Patent is hereby corrected as shown below:

The following should be added at column 1, between lines 3 and 5:

--STATEMENT REGARDING FEDERALLY SPONSORED
RESEARCH OR DEVELOPMENT

This invention was made with U.S. Government support. The U.S. Government has certain rights in this invention.--

Signed and Sealed this

Twenty-third Day of November, 1999

Attest:

Q. TODD DICKINSON

*Attesting Officer*      *Acting Commissioner of Patents and Trademarks*